United States Patent Office 3,349,100
Patented Oct. 24, 1967

3,349,100
PRODUCTION OF ALKYLENE MONO-THIOL-
CARBONATE AND ALKYLENE SULFIDE
Jose L. Villa, Hightstown, N.J., assignor to Thiokol
Chemical Corporation, Bristol, Pa., a corporation
of Delaware
No Drawing. Filed Oct. 23, 1965, Ser. No. 504,061
14 Claims. (Cl. 260—327)

The present invention relates to a novel process for the preparation of alkylene monothiocarbonate, a useful intermediate in the production of alkylene sulfide. More specifically, the invention relates to the reaction of an alkylene oxide with carbonyl sulfide using a novel catalyst system comprising at least one basic compound dissolved in formamide.

Alkylene sulfides are compounds that are useful both as such and as intermediates in the production of other compounds. Thus they have been used as the active ingredients in various insecticides, fungicides and the like for the extermination of insect pests and fungus growths. They polymerize readily to form polymers having useful properties as plastics. In addition, they have been proposed as a starting material in numerous syntheses described in the chemical literature.

Because of their tendency to polymerize, alkylene sulfides are somewhat unstable in storage in this respect. Hence efforts have been made to find intermediates for alkylene sulfides which are stable in storage and which are capable of being economically, easily and quickly converted to alkylene sulfides as needed. For example, U.S. Patent No. 2,828,318 discloses a process wherein phosgene and mercaptoethanol are reacted to form an ethylene thiocarbonate which can be stored until it is desired to generate ethylene sulfide. Upon heating the carbonate, a mixture of ethylene sulfide and carbon dioxide is evolved from which the ethylene sulfide can be readily condensed and collected. Similar processes were disclosed in copending U.S. applications S.N. 215,794 filed Aug. 9, 1962, in the names of S. W. Osborn and E. Broderick and S.N. 400,251 and S.N. 400,252 filed Sept. 29, 1964 in the names of E. Broderick and J. L. Villa, now matured to Patent Nos. 3,213,108; 3,282,960 and 3,240,788 respectively, wherein it is disclosed that alkylene sulfide can be prepared in good yields from an alkylene thiocarbonate which can itself be readily made by the reaction of carbonyl sulfide with alkylene oxide. This process utilizes either a solid catalyst bed, or a liquid catalyst bed wherein a small amount of catalyst is dissolved in a solvent such as tetrahydrofuran. However, one of the disadvantages of these processes is the relatively long reaction time necessary to obtain relatively low yields.

It is, therefore, an object of the present invention to provide an improved process for making alkylene sulfide. It is another object of the invention to provide a novel process for producing an alkylene monothiocarbonate intermediate. It is still a further object to provide a novel process with much shorter reaction times and improved yields for producing an alkylene monothiocarbonate intermediate, from which intermediate alkylene sulfide can be readily produced in a commercially feasible manner. Other objects of the invention will be apparent from the invention hereinafter described.

It has been unexpectedly found according to the present invention that when alkylene oxide is reacted with carbonyl sulfide in the presence of a catalyst system comprising a basic catalytic compound dissolved in formamide under the reaction conditions hereinafter described that unusually high yields of alkylene monothiocarbonate are obtained in a relatively short period of time. These good yields are even more unexpected in view of the relatively small amount of catalytic compound which need be used in the instant process.

The alkylene monothiocarbonate produced according to the present invention may be produced in the form of a polymer, in the form of a monomer or in the form of a mixture of monomer and polymer, depending upon the particular reactants and/or reaction conditions employed in the particular reaction. Alkylene sulfide can be prepared in good yields from either the monomeric or the polymeric forms of alkylene monothiocarbonate. The alkylene monothiocarbonate product produced according to the present invention is stable in storage and when heated to moderately elevated temperatures, either with or without a catalyst, it decomposes to yield a mixture of alkylene sulfide and carbon dioxide, from which the alkylene sulfide can be readily recovered.

In preparing the alkylene thiocarbonate material according to the present invention, alkylene oxide and carbonyl sulfide are reacted in the presence of a suitable catalyst at a temperature between about 25° C. and about 90° C., preferably between 40° C. and 80° C. Because of the volatility of the reactants and desirability of maintaining the reactants largely in the liquid phase, the reaction is advantageously conducted in a closed reactor at elevated pressures. Ordinarily, autogenous pressures are used since pressure has no apparent effect upon the yields. However, if a higher pressure is desired, a pressurized inert gas such as nitrogen can be introduced into the reactor.

The catalyst may be used in amounts of about 0.4 to 6%, and preferably 0.4 to 3% by weight based on the weight of the alkylene oxide charge. The reaction proceeds to completion ordinarily within about one to about four hours depending upon the reaction conditions, the proportions of the reactants and the catalyst used.

The catalytic compounds of the present invention may be completely dissolved in the formamide or they may be partially dissolved so as to form a slurry. It is also within the scope of the invention to add to the formamide catalyst system of the present invention solvents such as butyl carbitol formal, M-pyrol(N-methyl-2-pyrrolidone), methanol, dioxane, tetrahydrofuran, or benzene.

The alkylene oxides which may be used according to the present invention to form the analogous alkylene sulfides may be represented by the structure

wherein R, R$_1$, and R$_2$ and R$_3$ may be the same or different and may be H, an aryl group or a lower linear or cyclic alkyl group containing 1 to about 10 carbon atoms, depending on the desired alkylene sulfide product. Examples of such alkylene oxides are ethylene oxide, propylene oxide, 1,2- and 2,3-butylene oxide, isobutylene oxide, styrene oxide and cyclohexene oxide. Additionally, the alkylene oxide must be a gas, liquid or solid capable of being converted to the gaseous phase at the reaction temperature and pressure involved in the process.

While the carbonyl sulfide and ethylene oxide react in equimolar proportions, it is desirable that an excess of carbonyl sulfide be used in order to drive the reaction to completion.

It is important that no more than trace amounts of impurities are present in the reaction system. Thus, in order to obtain optimum yields of the alkylene monothiocarbonate product it is desirable to remove impurities such as water, hydrogen sulfide and carbon dioxide from the reactants, solvents and inert gases before the latter are charged to the reaction system.

The order in which the reactants are charged to the reactor is important because of the tendency of alkylene oxide to polymerize in the presence of strongly basic catalysts. Therefore, alkylene oxide should be introduced into the reactor after the carbonyl sulfide, catalyst and solvent have been charged to the reactor and the reactor heated to nearly the desired reaction temperature.

The alkylene monothiocarbonate product obtained by the present process is generally and preferably in the form of a monomeric liquid material which has the structure

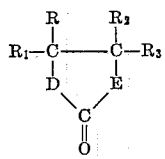

but it may also be a solid polymeric material which has the structure

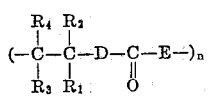

wherein R, $R_1$, $R_2$, and $R_3$ may be the same or different and may be H, an aryl group or a lower linear or cyclic group containing 1 to about 10 carbon atoms, and wherein D and E are selected from different members of the group consisting of sulfur and oxygen. In this equation n is an integer equal to 4 or greater and preferably about 30. The isomer wherein D is oxygen and E is sulfur is believed to predominate in the product mixture produced by the alkylene oxide and carbonyl sulfide reaction. However, the extent of the yield of alkylene sulfide obtainable from the alkylene monothiocarbonate product does not appear to depend upon which isomeric form is used, regardless of whether the product is in the monomeric or polymeric form.

The catalytic compounds which may be utilized in the catalyst system of the present invention are compounds which will act as a Lewis base or compounds which will furnish a Lewis base under the reaction conditions of the novel process of the present invention. These compounds must be at least partially soluble in the formamide. Solubility of the catalyst is a function of temperature, pressure, nature of the catalytic compounds, nature of the organic solvent, and other factors known to one skilled in the art.

The catalytic compounds which may be used in the catalyst system of the present invention include metal halides of Mendeleef[1] Periodic Table Groups I-A and II-A metals, and of certain Groups II-B and VIII metals i.e.—the halide of lithium, sodium, potassium, rubidium, cesium, beryllium, magnesium, calcium, strontium, cobalt, and cadmium. The hydroxides of the Mendeleef Periodic Table Groups I-A, II-A, III-A, II-B, and VIII metals may also be utilized in the catalyst system of the present invention in conjunction with an elemental halogen to form the metal halide in situ. In general the system $MOH+X_2$ is used where M is any Group I-A and II-A metal or certain Groups II-B and VIII metal and X is chlorine, bromine or iodine. Thus the metal halide is formed as follows:

$$2MOH+X_2 \rightarrow 2MX+H_2O+\tfrac{1}{2}O_2$$

Specific examples are: KOH used with $I_2$, CaOH used with $Br_2$, and NaOH used with $Cl_2$.

Other catalytic compounds which are suitable for use in the novel process of the present invention are the metal hydroxides of the Group I-A, II-A, III-A, II-B and VIII metals. Specific hydroxides of this type are the hydroxides of lithium, sodium, potassium, rubidium, cesium, beryllium, magnesium, calcium, strontium, boron, aluminum, iron, cobalt, nickel, ruthenium, rhodium, palladium, zinc, cadmium, and mercury.

Also suitable as catalytic compounds for the present invention are certain ammonium hydroxides and alkoxides such as, for example, tetra alkyl ammonium hydroxide, tetra alkyl ammonium methoxide, and trimethyl-beta-hydroxyethyl ammonium hydroxide.

Other oxygen containing compounds which may also be used in the catalyst system of the present invention include the metal oxides and alkoxides such as those of the Group I-A, II-A, III-A, IV-A, IV-B, and VIII metals. Specific compounds which may be used according to the present invention in this regard include: alkali metal oxides such as $Li_2O$, $Na_2O$, $K_2O$, $Rb_2O$ and $Cs_2O$; alkali metal alkoxides such as $NaOCH_3$, $LiOCH_3$, $NaOC_2H_5$, $NaOC_6H_5$, and $LiOC_6H_5$; alkaline-earth metal oxides such as MgO, CaO, SrO and BaO; boron oxides, such as $B_2O_3$; aluminum oxides, such as, $Al_2O_3$; aluminum alkoxides such as, $Al[OHC(CH_3)_2]_3$ and $Al[OC(CH_3)_3]_3$; zirconium oxides such as $ZrO_2$; thorium oxides such as $ThO_2$; silicon oxides such as $SiO_2$; iron oxides, such as $Fe_2O_3$; nickel oxides, such as, NiO; and copper oxides such as CaO. The alkoxides may be defined generally by the formula: $M(OR)_n$ where M is the metallic constituent, R is a lower alkyl group of from about 1 to about 4 carbon atoms, and n is the valence of M. Sodium methoxide is a preferred catalytic compound to use in the novel catalyst system of the present invention.

Other catalytic compounds which may be used are Groups I-A, II-A and III-A metal salts of organic carboxylic acids and phenols. These would include the Groups I-A, II-A and III-A acetates, oxlates, benzoates, laurates, phenates, salicylates, naphthoates, cinnomates, lactates and succinates.

Also suitable for catalytic compounds are the Groups I-A, II-A, and III-A metal phosphates, borates, cyanates, thiocyanates, flurosilicates, iodates, molybdates, thiosulfates, cyanides, silicates, titanates, aluminates, stannates, sulfides, and tungstates. Specific examples of such compounds are:

$Na_3PO_4$, $NaH_2PO_4$, $Na_2HPO_4$, $Ca(BO_2)_2$, NaCNO, NaCNS, $CaSiF_6$, $KiO_3$, $Na_2MoO_4$, $K_2S_2O_3$, KCN, $Na_2Si_2O_5$, $K_2Ti_3O_7$, $NaAlO_2$, $K_2SnO_3$, $Na_2S$ and $Na_2WO_4$.

Also suitable as catalytic compounds in the process of the present invention are the Groups I-A, II-A and III-A metal salts of carbonic and thiocarbonic acids and their alkyl esters. Included among these compounds are the Groups I-A, II-A and III-A metal monothiocarbonates such as $NaSCO_2R$; dithiocarbonates such as $KSCSOR$; trithiocarbonates such as LiSCSSR; and other compounds such as $Na_2SCO_2Na$, NaSCSONa, NaSCSSNa, NaOCONa, $Na_2CSO_2$, $Na_2CS_2O$, and $Na_2CS_3$.

Basic amine compounds may also be used in the catalyst system of the present invention and they include, for example, triethanolamine, diethanolamine, n-butylamine, tert-butylamine, and trimethylenediamine and tertiary amine catalytic compounds of the formula:

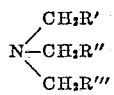

wherein R', R" and R''' are selected from hydrogen and alkyl and aryl groups of 1 to 6 carbon atoms, the R', R" and R''' groups may be the same or different. In the above formula R', R" and R''' may be phenyl groups or alkyl groups such as methyl, ethyl propyl, isopropyl or hexyl groups. Typical amines that fall within the scope of the above formula are trimethyl, triethyl, triisopropyl, methyldiethyl, dimethylbenzyl and dimethylisobutyl amines. The preferred amine catalyst is trimethylamine.

---

[1] The periodic table referred to is the Mendeleef Table printed in Lange's Handbook of Chemistry, Ninth Edition, McGraw-Hill, 1956, pp. 56–57.

Quaternary ammonium salts may also be used as catalysts in the catalyst system of the present invention. Specific examples are compounds such as tetraethylammonium iodide, the iodide salt of choline chloride, and hexamethylenetetramine ethiodide.

The alkylene sulfide can be prepared by heating the alkylene monothiocarbonate material at between about 140° and about 210° C. and preferably between about 180° and about 210° C., whereupon it decomposes to give alkylene sulfide and carbon dioxide (hereinafter called the "pyrolysis step"). The reaction may be conducted in a simple distillation vessel. The carbon dioxide by-product may be vented or collected as desired. Alkylene sulfide obtained from the reaction may be purified by distillation. The heating of the alkylene monothiocarbonate material preferably is conducted in the presence of a basic catalyst, such as potassium carbonate, sodium methoxide, sodium hydroxide, sodium phosphate, sodium acetate and sodium borate. The use of such a catalyst is desirable to get improved yields of the alkylene sulfide. Since the alkylene monthiocarbonate of the process of the present invention is formed in the formamide catalyst system which already has dissolved therein a relatively small amount of basic catalyst, it is unnecessary to add additional catalyst in the pyrolysis step. This results in a simplified and a more economical process for producing alkylene sulfide as compared to the prior art processes. A further advantage of the process of the present invention is that the alkylene monothiocarbonate produced by this process is generally in a liquid state, rather than in a solid state as is so in the prior art processes. This liquid product is easier to handle than a solid product; thus adding to the efficiency and economy of the process.

The following examples, which are set forth to illustrate embodiments of the present method of making monomeric and/or polymeric alkylene monothiocarbonate, are not intended to limit in any way the scope of the present invention.

*Example 1*

A pressure reactor was charged with 1 gram of sodium methoxide, 120 grams (2 moles) of carbonyl sulfide (COS) and 44 grams (1 mole) of ethylene oxide (EO). The sodium methoxide was introduced into the reactor followed by the COS in gaseous form. Thereafter liquid EO was added to the reactor. The pressure reactor was heated by means of a water bath and stirred by means of a magnetic stirrer. The reaction was allowed to run for 3 hours. At the beginning of the run the catalyst bed had a temperature of 47° C. and a pressure of 245 p.s.i. At the end of the run, the temperature had risen to 53° C. and the pressure had risen to 284 p.s.i. The reactor was cooled and vented. 46 grams of solid ethylene monothiocarbonate polymer product was obtained to give a 44.2% yield.

*Examples 2 and 3*

The same general procedure was followed as outlined above in Example 1 except that the sodium methoxide was first dissolved in formamide. The sodium methoxide in solution was then introduced into the reactor. Results from Examples 2 and 3 are compared in Table I.

*Examples 4, 5 and 6*

The apparatus and general procedure of Example 1 was followed except that the sodium methoxide was first dissolved in tetrahydrofuran. The sodium methoxide in solution was then introduced into the reactor. Results from Examples 4–6 are compared in Table I. It should be noted that the yields of Example 4 (i.e.—52.2%) was obtained only after a very long reaction time (i.e.—116 hours).

TABLE 1

| Example Number | Catalyst System | Mole Ratio (EO/COS) | Time (hours) | Temperature (° C.) | Pressure (p.s.i.g.) | Percent Yield (physical state of product) |
|---|---|---|---|---|---|---|
| 1 | 1 gram NaOCH₃ | 1/2 | 3 | 47–53 | 245–284 | 44.2 (solid). |
| 2 | 1 gram NaOCH₃ / 10 grams formamide | 1/1.75 | 3 | 46–53 | 250–310 | 95.2 (liquid). |
| 3 | 1 gram NaOCH₃ / 10 grams formamide | 1/1.8 | 3 | 48–53 | 278–302 | 100 (liquid). |
| 4 | 1 gram NaOCH₃ / 100 ml. THF | 1/1.5 | 116 | 25–27 | 50–90 | 52.2 (solid). |
| 5 | 1 gram NaOCH₃ / 100 ml. THF | 1/1.5 | 18 | 24–28 | 135–175 | 3.2 (solid). |
| 6 | 4 grams NaOCH₃ / 100 ml. THF | 1/1.5 | 19½ | ¹ 23–47 | 100–190 | 9.6 (solid). |

¹ Avg. of about 30.

*Example 7*

The reaction mixture of liquid ethylenemonothiocarbonate and formamide catalyst system of Example 2 was charged into a suitable reaction vessel and heated to a temperature of 198° C. to 200° C. for about 2 hours. 25.9 grams of ethylene sulfide product was formed, along with 10 grams of residue for an 83% yield of ethylene sulfide product.

*Example 8*

A pressure reactor as in Example 1, was charged with 2 grams of sodium cyanide dissolved in 50 grams of formamide, 116 grams (1.9 moles) of carbonyl sulfide (COS) and 44 grams (1 mole) ethylene oxide (EO). The reaction was conducted according to the procedure of Example 1. The reactor was allowed to run for 2 hours at a temperature of from 39° C. to 47° C. and at a pressure of from 275 p.s.i. to 295 p.s.i. A liquid ethylene monothiocarbonate product formed which was calculated to be 100% yield based upon the amount of ethylene oxide used in the reaction.

*Example 9*

The apparatus of Example 1 was charged with 1 gram of sodium phenate dissolved in 10 grams of formamide, 109 grams (1.8 moles) of carbonyl sulfide (COS) and 44 grams (1 mole) of ethylene oxide (EO). The general procedure of Example 1 was followed. The reaction was conducted for 3 hours at a temperature of from 36° C. to 51° C. and at a pressure of from 210 p.s.i. to 316 p.s.i. 94.7% yield of liquid ethylene monothiocarbonate product was formed based on the amount of ethylene oxide used in the reaction.

*Example 10*

The apparatus of Example 1 was charged with 2 grams of sodium phenate dissolved in 50 grams of formamide, 123 grams (2.05 moles) of carbonyl sulfide (COS) and 58 grams (1 mole) of propylene oxide (PO). The reaction conducted according to the general procedure of Example 1 at a temperature of from 38° C. to 42° C. and a pressure of from 243 p.s.i. to 280 p.s.i. for 2½ hours. 77 grams of liquid propylene monothiocarbonate product was obtained for a 65% yield based on the amount of propylene oxide used in the reaction.

Example 11

The apparatus of Example 1 was charged with 2 grams of sodium cyanide dissolved in 50 grams of formamide, 106 grams (1.76 moles) of carbonyl sulfide and 58 grams (1 mole) of propylene oxide (PO). The general procedure of Example 1 was followed. It was conducted for about 3½ hours at a temperature of from 30° C. to 64° C. and at a pressure of from 223 p.s.i. to 238 p.s.i. The liquid propylene monothiocarbonate had a weight of 116 grams for a 98% yield.

I claim:

1. In a process of producing an alkylene monothiocarbonate product by reacting carbonyl sulfide with alkylene oxide in the presence of a basic catalytic compound at a temperature of from about 25° C. to about 90° C., the improvement which comprises forming a novel catalyst system by at least partially dissolving said catalytic compound in formamide prior to the reacting of the carbonyl sulfide with the alkylene oxide.

2. A process for producing an alkylene monothiocarbonate product which comprises reacting carbonyl sulfide with an alkylene oxide in the presence of a catalyst system comprising a catalytic compound dissolved in formamide at a temperature of from about 25° C. to about 90° C., said catalytic compound being a compound which will act as a Lewis base and which will be at least partially soluble in the formamide.

3. A process as in claim 2, wherein said catalytic compound is sodium methoxide.

4. A process as in claim 2, wherein said catalytic compound is sodium cyanide.

5. A process as in claim 2, wherein said catalytic compound is sodium phenate.

6. A process as in claim 2 wherein said alkylene oxide is ethylene oxide.

7. A process as in claim 2 wherein said alkylene oxide is propylene oxide.

8. A process as in claim 2 which is conducted at a temperature of from about 40° C. to about 80° C.

9. A process as in claim 2 wherein the reaction is carried out with an excess of the carbonyl sulfide.

10. A process as in claim 9 wherein the reaction is carried out at autogenous pressure.

11. A process of producing alkylene sulfide which comprises reacting carbonyl sulfide with alkylene oxide in the presence of a catalyst system comprising a basic catalytic compound which is at least partially dissolved in formamide at a temperature of from about 25° C. to about 90° C. to produce an alkylene monothiocarbonate product, and then heating said alkylene monothiocarbonate product at a temperature of from about 140° C. to about 210° C. to produce alkylene sulfide.

12. A process of producing ethylene sulfide which comprises reacting carbonyl sulfide with ethylene oxide in the presence of a catalytic compound dissolved in formamide at a temperature of from about 40° C. to about 80° C., said catalytic compound being a compound which will act as a Lewis base and which will be at least partially soluble in the formamide, to produce ethylene monothiocarbonate; and then recovering said ethylene monothiocarbonate from the reactor; and then heating said ethylene monothiocarbonate at a temperature of from about 180° C. to about 210° C. to produce ethylene sulfide.

13. A process as in claim 12 wherein said catalytic compound is sodium methoxide.

14. A process as in claim 13 wherein said reaction takes place at autogenous pressures.

References Cited

Durden et al.: J. Org. Chem., vol. 26 (1961), pp. 836–9.

Parker: Advances in Organic Chemistry, vol. 5 (1965), pp. 2 and 5–10.

JAMES A. PATTEN, *Primary Examiner.*